June 13, 1961    R. L. LICH    2,988,375
TRACTOR-TRAILER SPRING ARRANGEMENT
Filed April 21, 1958
FIG. 1
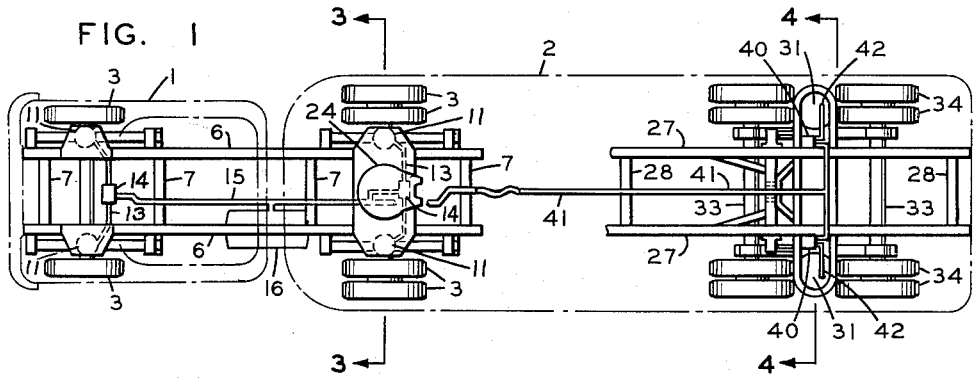
FIG. 2
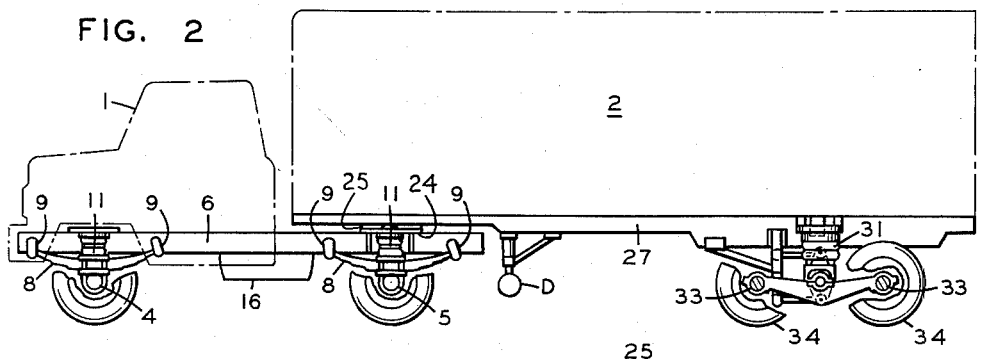
FIG. 5
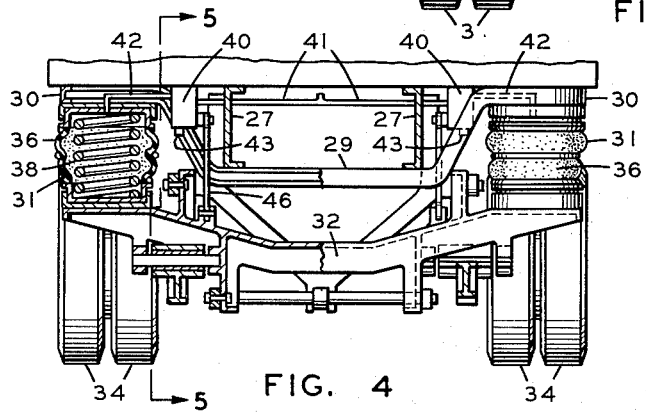
FIG. 3
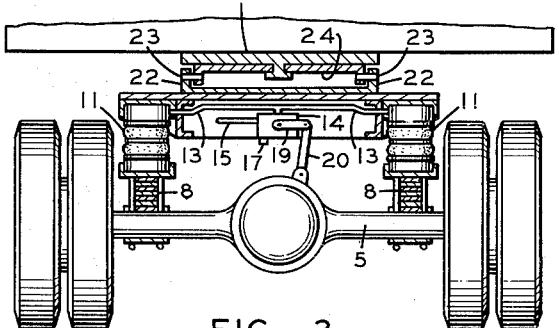
FIG. 4
INVENTOR.
RICHARD L. LICH
BY
Francis N. Burgess
ATTORNEY

United States Patent Office 2,988,375
Patented June 13, 1961

2,988,375
TRACTOR-TRAILER SPRING ARRANGEMENT
Richard L. Lich, Ferguson, Mo., assignor to General Steel Castings Corporation, Granite City, Ill., a corporation of Delaware
Filed Apr. 21, 1958, Ser. No. 729,904
7 Claims. (Cl. 280—124)

The invention relates to spring systems for highway tractor-trailer combination vehicles and consists particularly in a combination metal and pneumatic spring system having automatic load-responsive height regulation.

In the usual tractor-trailer combination vehicle, the semi-trailer is supported at its forward end through a pivot center plate or fifth wheel over the rear axle of the tractor, and at its rear end directly on a single-axle or a double-axle bogie. Since the fifth wheel connection between the tractor and semi-trailer is rigid transversely of the vehicle, the transverse inclinations of the two units are always the same. Because the combination vehicles are relatively long and the roadways over which they operate frequently have varying transverse slopes, any suspension system including automatic load-responsive level regulation capable of maintaining both sides of the vehicle at the same height, must also be arranged to eliminate conflict between the systems of the two units resulting from variations in transverse slope of the roadway. Moreover, the tractor must sometimes be operated without a trailer, and accordingly it must have independent means for maintaining its stability against tilt or roll about a longitudinal axis when operated light, but such means must not conflict with the level regulation system of the trailer.

It is a principal object of the invention to provide stability against tilting about a longitudinal axis to a highway tractor operating light and to provide load-responsive level regulation and similar stability to a combination vehicle consisting of the same tractor and a coupled semi-trailer.

It is a further object to achieve complete compatibility between light-weight lateral stabilizing means and load-responsive level-regulating means on the tractor, and lateral stabilizing and load-responsive level-regulating means on the semi-trailer whereby to eliminate conflict between the tractor and semi-trailer suspension systems during operation on roadways having varying transverse slopes.

I accomplish these objectives by providing that during light operation of the tractor, its entire load is carried by metal springs so that roll stability is thereby achieved. In parallel with the metal springs on the tractor, I utilize pneumatic springs, the height of which is governed by a single leveling valve at the transverse center of each axle. Because the metal springs are adapted to support the light load of the tractor, the leveling valves do not come into play until a pay load carried by the semi-trailer is coupled to the tractor. On the semi-trailer bogie, I provide a pair of laterally spaced combination coil and air springs, the pneumatic portions of which are regulated by similarly laterally spaced level-regulating valves, so that during light load conditions the entire load will be carried by the coil springs, and during pay load conditions, the leveling valves will function to maintain the semi-trailer floor at its light load height and will, due to their lateral spacing, maintain both sides of the trailer at the same height. By reason of the rigidity of the semi-trailer body structure, the lateral stability thus imparted to the semi-trailer will be transmitted through the cooperating fifth wheel structures to the rear portion of the tractor and will thus stabilize the tractor laterally, and since there is only a single level regulating valve at the center of each of the tractor axles, the tractor will be free to roll about its longitudinal axis a sufficient amount to accommodate itself to the lateral inclination of the semi-trailer at any time.

In the accompanying drawings:
FIGURE 1 is a plan view of a tractor-trailer combination vehicle embodying my proposed suspension.
FIGURE 2 is a side elevation view of the vehicle illustrated in FIGURE 1.
FIGURE 3 is a transverse vertical sectional view along the line 3—3 of FIGURE 1.
FIGURE 4 is a transverse vertical sectional view along the line 4—4 of FIGURE 1.
FIGURE 5 is a longitudinal vertical sectional view along the line 5—5 of FIGURE 4.

Referring now more particularly to the drawings, the reference numerals 1 and 2 indicate, respectively, a highway tractor and semi-trailer of generally conventional construction coupled to tractor 1. The tractor comprises the usual wheels 3 and associated front axle 4 and rear axle 5, an underframe consisting of a pair of laterally-spaced, longitudinally extending channel members 6 connected by a plurality of transverse members 7, and the usual cab and other appurtenances. Tractor underframe channel members 6 are supported on the end portions of axles 4 and 5 by spring units each comprising a semi-elliptic leaf spring 8, the central portion of which is clamped to the axle. Frame members 6 are suspended from the ends of springs 8 by the usual shackles 9. An upright bellows-type pneumatic spring 11 is seated on the central portion of each elliptic spring 8; the two pneumatic springs on each axle are connected by suitable piping 13 to a valve 14 which may be a three-way valve of well-known construction, one of the ports being connected by suitable piping 15 to a reservoir 16 supported from the tractor underframe, and the third port 17 exhausting to the atmosphere. The valve is actuated by a pivoted arm 19 connected by a normally vertical link 20 to the central portion of the axle. When the tractor is operated light, the leveling valve structure will assume the configuration shown in FIGURE 3, the vehicle load being carried by the leaf springs 8 and the valve port communicating with passage 13 leading to the springs, closed. Upon application of a load in excess of the tractor light load, springs 8 and 11 will be initially depressed so that link 20 will cause an upward movement of valve operating arm 19. This will open a port in the valve communicating between reservoir passage 15 and spring passage 13, thus admitting additional air to the springs until the height of the center of the frame is the same as the light weight height, at which time link 20 and arm 19 will be returned to their original position, closing the connection between reservoir piping 15 and spring piping 13. When a pay load is removed from the tractor, so that due to the large amount of air in the springs, the tractor underframe moves upwardly, link 20 will cause a corresponding downward movement of valve actuating arm 19. This latter movement will open communication between spring passage 13 and exhaust port 17, air being exhausted from springs 11 until the normal light weight height is reached, upon which occurrence link 20 and valve actuating arm 19 will return to their normal median position as shown in FIGURE 3, and all communication through valve 14 will be terminated. Except under light load conditions when the entire tractor load is supported by metal springs 8, it will be noted from the foregoing that because there is only a single regulating valve at the center of each axle, feeding both springs at each side of the vehicle, the tractor will be free to roll laterally to the extent that its weight is supported by the pneumatic springs.

Above the rear axle, the tractor underframing supports a pair of laterally-spaced, transversely aligned upstanding bearing members 22 which pivotally mount the transversely extending trunnions 23 of fifth wheel 24. This structure is pivoted on a transverse axis to the tractor for aid in engaging it with a co-operating fifth wheel 25 on the trailer 2 and for accommodating the combined vehicle to longitudinal irregularities such as humps and dips in the roadway.

The semi-trailer underframe comprises a pair of longitudinal channel-shaped sills 27 spaced apart laterally and extending longitudinally of the trailer. Sills 27 are connected at intervals by transverse frame members 28 and are supported at their forward ends on fifth wheel 25 and at their rear ends on a U-shaped transversely extending member 29 which in turn is supported at its outer ends 30, 30, through combination air and coil springs 31, on bogie framing 32 supported by tandem axles 33, 33 and dual wheels 34, 34. A pair of retractable dolly wheels D is provided under the forward portion of the trailer underframe to support it when it is uncoupled from the tractor.

Tandem axle bogie 31, 32, 33, 34 is of the type described in my co-pending application, Serial No. 640,663, filed February 18, 1957. To obtain the widest spring base, combination coil and air springs 31 are seated on the lateral extremities of the bogie framing.

Springs 31 each consist of an outer flexible walled sealed pneumatic chamber 36 being arranged to support the light load of the trailer. Thus it will be seen that during light operation of the trailer, the wide lateral spacing of the supporting coil springs 38 will provide stability against lateral roll just as the elliptic springs on the tractor do under light load conditions.

For maintaining the trailer floor height substantially constant regardless of load and for providing stability against tilting or roll about a longitudinal axis regardless of the lateral distribution of the load, a pair of laterally-spaced leveling valves 40 are provided. These valves, similar to valve 14 on the tractor, each have three ports, one connected by suitable piping 41 to the air reservoir on the tractor, a second port connected by suitable piping 42 to the pneumatic chambers 36, and the third, an exhaust port 43. Valves 40 are each provided with an actuating arm 45 connected by an upright link 46 with bogie framing 32 so that changes in height responsive to changes in load will cause corresponding changes in the position of operating arm 45 and corresponding changes in the connection of the pneumatic chambers to the reservoir or to the exhaust port, or closure of the connection to the pneumatic chamber. By reason of the lateral spacing of valves 40 it will be seen that they will operate at all times regardless of variations in load from one side of the trailer to the other, to maintain the trailer floor parallel to the roadway. Through the trailer framing this parallelism will be transmitted to and through the mating fifth wheel structures into the tractor, and any tendency of the tractor body to roll will thus be resisted.

Operation of the system is as follows:

Assuming the trailer to be uncoupled and awaiting a load, its forward end will be supported by the usual dolly D and its rear end will be supported by the coil springs 38. The unloaded tractor in turn will be supported solely by elliptic springs 8 and will thus, during light operation, have adequate lateral stability. Upon coupling tractor 1 to trailer 2 and connecting the air lines by suitable hosing to provide necessary flexibility between the two units, the application of the trailer load to the tractor through the mating fifth wheels will cause valve 14 to admit air to tractor air springs 11, and additional air will be admitted until the normal spring height is reached, at which time valve 14 will close and seal spring 11. Similarly the laterally spaced valves on the trailer will each admit air to their associated spring. If the trailer is more heavily loaded on one side than on the other, the more heavily loaded side will be the more depressed, and accordingly more air will be admitted to that spring than to the spring on the opposite side, until the two springs are again at equal heigh. During movement of the vehicle, assuming irregularities in the transverse slope of the roadway over which the vehicle operates, the rear end of the trailer will determine the transverse inclination of both the tractor and the trailer, since the tractor has only central rather than laterally spaced leveling valves. Thus if the surface beneath the trailer bogie is sloping to the right and that beneath the truck wheels is sloping to the left, the inclination of the trailer body will govern, and through the fifth wheel, will cause similar inclination of the tractor since the two oppositely disposed springs on each axle of the tractor constitute a single pneumatic system.

The details of the structure may be varied substantially without departing from the spirit of the invention, and the exclusive use of those modifications as come within the scope of the appended claims is contemplated.

What is claimed is:

1. A vehicle comprising a first unit spring supported on a pair of longitudinally-spaced wheeled axle structures and a second unit removably-supported at its one end on an end portion of said first unit and at its other end supported on wheeled axle structure, spring supports for said units on said axle structures comprising transversely-spaced metal springs adapted to support the light load of each of said units and upright pneumatic springs spaced apart transversely of the vehicle and adapted to support loads in excess of the light load of the units, load responsive means on said first unit maintaining height of the transverse center of said first unit substantially constant by admitting compressed air to and discharging air from said springs, and load-responsive means on said second unit maintaining the sides of said second unit at substantially constant equal heights by admitting compressed air to and discharging compressed air from said springs.

2. A vehicle comprising a first unit having wheels and associated axle structure near each of its ends, metal springs carried by the end portions of both said axle structures, framing structure supported on said springs, a horizontal bearing surface supported on said framing structure near one end, pneumatic springs associated with the metal springs at the end of said unit adjacent said horizontal bearing surface, a second unit comprising framing structure supported at its one end on said bearing surface and secured thereto and having wheels and associated axle structure beneath its other end, metal and pneumatic springs carried by the end portions of the second unit axle structure, a compressed air source, a single valve responsive to changes in height between said first unit framing and the center portion of the axle structure adjacent said bearing surface for admitting air from said source to both pneumatic springs on said adjacent axle and venting said springs to atmosphere in accordance with changes in the applied load whereby to maintain the height of the transverse center of said first unit framing substantially constant, and a pair of similar valves responsive to changes in height between said second unit framing and the end portions of the axle structure of said second unit, each valve of said pair being connected to an adjacent pneumatic spring and arranged to admit air from said source to the associated spring and to vent the associated spring to atmosphere in accordance with the load applied to the associated end of the axle for maintaining the framing height at both ends of the axle substantially constant and equal regardless of load.

3. A vehicle according to claim 2 in which said first unit is a tractor and said second unit is a semi-trailer.

4. A vehicle according to claim 2 in which pneumatic springs are carried by end portions of the first unit axle structure at the opposite end of the first unit from the horizontal bearing surface, and a second single valve responsive to changes in height between said first unit and the center portion of said opposite end axle is provided for admitting air from said source to both the pneumatic springs on said opposite end axle and venting said springs to atmosphere in accordance with changes in the applied load whereby to maintain the height of the transverse center of said first unit substantially constant.

5. A vehicle according to claim 2 in which said metal springs support the light weight of said vehicle.

6. A vehicle according to claim 2 in which said horizontal bearing surface is supported on said first unit framing for limited rotation solely about a transverse pivot axis whereby to accommodate coupling and uncoupling of said second unit to it and to accommodate the combination vehicle to dips and humps in the roadway while preventing relative tilting of said units about longitudinal axes.

7. A vehicle according to claim 2 in which said second unit axle structure comprises a pair of axles spaced apart longitudinally of the vehicle, framing connecting said axles, said springs being seated on the side portions of said framing intermediate said axles.

References Cited in the file of this patent

UNITED STATES PATENTS

| | | |
|---|---|---|
| 1,869,285 | Taber | July 26, 1932 |
| 2,361,575 | Thompson | Oct. 31, 1944 |
| 2,670,201 | Rossman | Feb. 23, 1954 |
| 2,691,420 | Fox | Oct. 12, 1954 |
| 2,743,939 | Reid | May 1, 1956 |
| 2,790,650 | Boschi | Apr. 30, 1957 |
| 2,882,068 | Faiver | Apr. 14, 1959 |

FOREIGN PATENTS

| | | |
|---|---|---|
| 1,153,847 | France | Oct. 14, 1957 |

OTHER REFERENCES

Homan Tandem Publication, June 22, 1954.
Homan Tandem Publication, Service Instructions, June 22, 1954.